(12) United States Patent
Rodgers et al.

(10) Patent No.: US 7,305,168 B1
(45) Date of Patent: Dec. 4, 2007

(54) ELECTRONIC/PHOTONIC BANDGAP DEVICE (75) Inventors: J. Scott Rodgers, San Diego, CA (US); Joanna N. Ptasinski, San Diego, CA (US); Stephen D. Russell, San Diego, CA (US); Michael G. Lovern, Spring Valley, CA (US); Randy L. Shimabukuro, Kapolei, HI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/729,595

(22) Filed: Mar. 29, 2007

Related U.S. Application Data (63) Continuation-in-part of application No. 11/416,507, filed on Apr. 12, 2006, now Pat. No. 7,233,730, which is a continuation-in-part of application No. 11/332,437, filed on Jan. 13, 2006, now Pat. No. 7,194,175.

(51) Int. Cl.
G02B 6/10 (2006.01)

(52) U.S. Cl. .................. 385/131; 385/129; 385/130; 385/146; 385/14; 385/24; 385/141; 385/125

(58) Field of Classification Search ............... 385/129, 385/130, 131, 132, 122, 141, 14, 24, 146, 385/125
See application file for complete search history.

(56) References Cited

U.S. PATENT DOCUMENTS

| | | | | |
|---|---|---|---|---|
| 6,366,392 B1 * | 4/2002 | Tokushima | ................. | 359/321 |
| 6,466,360 B2 * | 10/2002 | Tokushima | ................. | 359/321 |
| 6,597,851 B2 * | 7/2003 | Johnson et al. | ............. | 385/131 |
| 6,936,854 B2 * | 8/2005 | Iwasaki et al. | ............... | 257/81 |
| 7,194,175 B1 * | 3/2007 | Rodgers et al. | ............. | 385/131 |
| 7,233,730 B1 * | 6/2007 | Rodgers et al. | ............. | 385/131 |
| 7,269,323 B1 * | 9/2007 | Rodgers et al. | ............. | 385/131 |

* cited by examiner

*Primary Examiner*—Brian M. Healy
(74) *Attorney, Agent, or Firm*—Peter A. Lipovsky; J. Eric Anderson; Allan Y. Lee (57) ABSTRACT

A Electronic/Photonic Bandgap Device (NC#98614). The apparatus includes a substrate; an electronics layer operatively coupled to the substrate; and an optical bus layer operatively coupled to the electronics layer. The optical bus layer comprises at least one 3D photonic bandgap structure having at least one period operatively coupled to the electronics layer and comprising a plurality of honeycomb-like structures having a plurality of high index regions and a plurality of low index regions, wherein the plurality of honeycomb-like structures comprises at least four honeycomb-like structures layered over each other, wherein a second honeycomb-like structure is offset from a first honeycomb-like structure, wherein a third honeycomb-like structure is offset from a second honeycomb-like structure, and wherein a fourth honeycomb-like structure is not offset from the first honeycomb-like structure. The 3D photonic bandgap structure and the electronics layer are monolithically integrated over the substrate.

12 Claims, 13 Drawing Sheets

(Note: Figs 1A -1D Are Not Drawn To Scale Relative To Each Other)

(Note: Figs 1A -1D Are Not Drawn To Scale Relative To Each Other)

FIG. 8C Side View

FIG. 9

ELECTRONIC/PHOTONIC BANDGAP DEVICE

CROSS-REFERENCE TO RELATED APPLICATION

This application is a continuation-in-part of U.S. application Ser. No. 11/416,507, now U.S. Pat. No. 7,233,730, filed Apr. 12, 2006, entitled "3D Photonic Bandgap Device in SOI Method", which is a continuation-in-part of U.S. application Ser. No. 11/332,437, filed Jan. 13, 2006, now U.S. Pat. No. 7,194,175, entitled "3D Photonic Bandgap Device in SOI", both of which are hereby incorporated by reference herein in its entirety for its teachings on communications systems, and referred to hereafter as "the parent application" and "the grandparent application," respectively.

This application is related to U.S. Pat. No. 6,597,851 B2, entitled "Periodic Dielectric Structure Having a Complete Three-Dimensional Photonic Band Gap," by Johnson et al. issued Jul. 22, 2003, which is hereby incorporated by reference herein in its entirety for its teachings on photonic bandgap devices and is hereinafter referred to as the "Johnson patent."

FEDERALLY SPONSORED RESEARCH AND DEVELOPMENT

This invention (Navy Case No. 98614) is assigned to the United States Government and is available for licensing for commercial purposes. Licensing and technical inquiries may be directed to the Office of Research and Technical Applications, Space and Naval Warfare Systems Center, San Diego, Code 2112, San Diego, Calif., 92152; voice (619) 553-2778; email T2@spawar.navy.mil. Reference Navy Case Number 98614.

BACKGROUND

The Electronic/Photonic Bandgap Device is generally in the field of photonic bandgap devices.

Typical photonic bandgap devices are two dimensional and are not co-fabricated with electronic devices on semiconductor on insulator (SOI).

A need exists for photonic bandgap devices that are three dimensional and are co-fabricated with electronic devices on SOI.

DETAILED DESCRIPTION

Described herein is Electronic/Photonic Bandgap Device.

Definitions

The following acronyms are used herein:

Acronym(s):

3D—three dimensional

E/P—Electronic/Photonic

PBG—Photonic Bandgap

SOI—Semiconductor on Insulator

The 3D photonic bandgap (PBG) device in SOI (semiconductor on insulator) includes a 3D PBG structure fabricated in SOI. In one embodiment, the present 3D PBG device in SOI includes a 3D PBG structure having one period in a selected axis. In one embodiment, the present 3D PBG device in SOI includes a 3D PBG device having a funnel-shaped waveguide. In one embodiment, the present 3D PBG device in SOI includes a 3D PBG device monolithically fabricated with at least one electronic component in SOI.

Figure 1A:
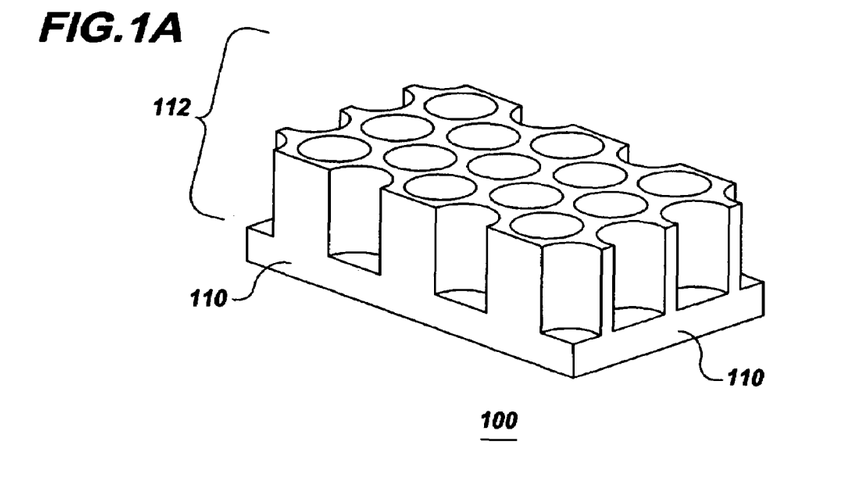
FIG. 1A is a perspective view of one embodiment of a 3D photonic bandgap device.
Figure 1B:
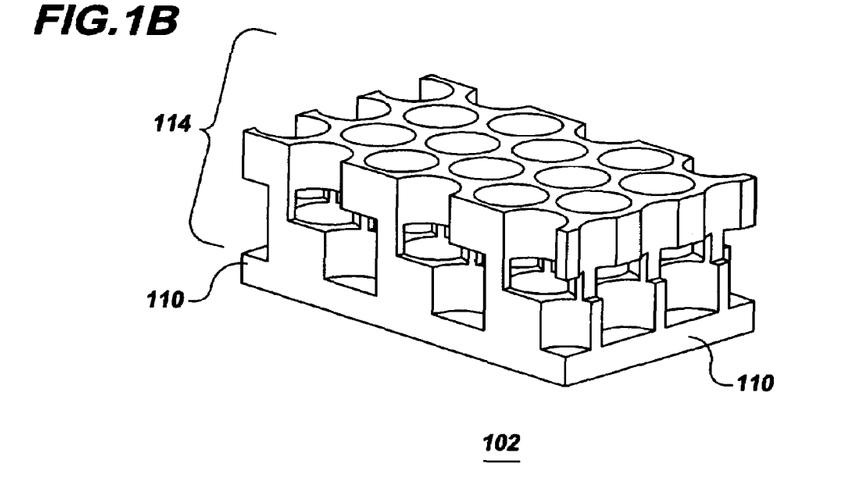
FIG. 1B is a perspective view of one embodiment of a 3D photonic bandgap device.
Figure 1C:
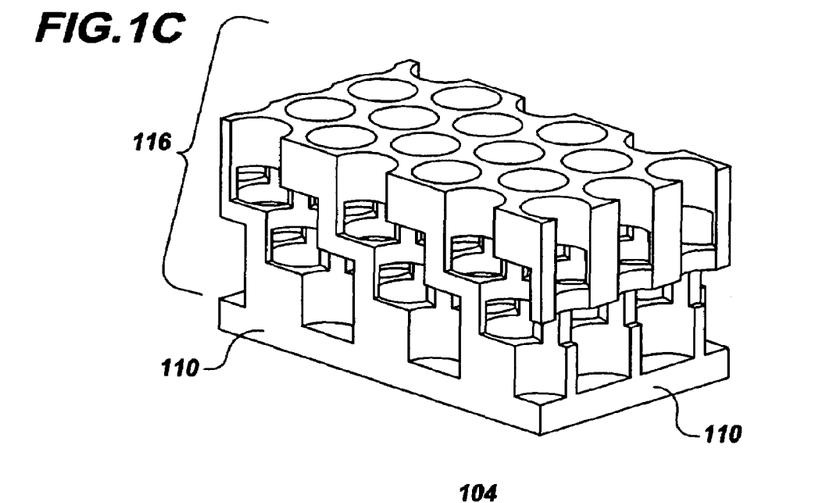
FIG. 1C is a perspective view of one embodiment of a 3D photonic bandgap device.

FIGS. 1A-1C are perspective views of embodiments of a 3D photonic bandgap device in intermediate stages of fabrication. FIG. 1A is a perspective view of one embodiment of a 3D photonic bandgap device in an intermediate stage of fabrication. As shown in FIG. 1A, 3D PBG device 100 includes substrate 110 and PBG structure 112. Substrate 110 comprises a semiconductor layer over an insulator layer. Exemplary semiconductor layers include silicon, germanium, silicon-germanium and similar semiconductor alloys. Exemplary insulator layers include quartz, silicon dioxide and sapphire. In one embodiment, substrate 110 includes a silicon layer over an insulator layer. In one embodiment, substrate 110 includes a silicon layer over a quartz layer. In one embodiment, substrate 110 includes a silicon layer over a sapphire layer. PBG structure 112 comprises a honeycomb-like structure having high index regions and low index regions. The honeycomb-like structure includes cylinders having a diameter and height. In one embodiment, the low index regions of PBG structure 112 comprise air. In one embodiment, the low index regions of PBG structure 112 comprise silicon dioxide. In one embodiment, the high index regions of PBG structure 112 comprise silicon.

FIG. 1B is a perspective view of one embodiment of a 3D photonic bandgap device in an intermediate stage of fabrication. As shown in FIG. 1B, 3D PBG device 102 includes substrate 110 and PBG structure 114. Substrate 110 of FIG. 1B is substantially similar to substrate 110 of FIG. 1A, and thus, is not described hereinagain. PBG structure 114 of FIG. 1B is similar to PBG structure 112 of FIG. 1A, however, PBG structure 114 includes a second honeycomb-like structure over the first honeycomb-like structure of PBG structure 112 of FIG. 1A. The second honeycomb-like structure is offset from the first honeycomb-like structure. In one embodiment, the second honeycomb-like structure is offset from the first honeycomb-like structure by approximately one-third of a diameter of a cylinder.

FIG. 1C is a perspective view of one embodiment of a 3D photonic bandgap device in an intermediate stage of fabrication. As shown in FIG. 1C, 3D PBG device 104 includes substrate 110 and PBG structure 116. Substrate 110 of FIG. 1C is substantially similar to substrate 110 of FIG. 1A, and thus, is not described hereinagain. PBG structure 116 of FIG. 1C is similar to PBG structure 114 of FIG. 1B, however, PBG structure 116 includes a third honeycomb-like structure over the second honeycomb-like structure of PBG structure 114 of FIG. 1B. The third honeycomb-like structure is offset from the first honeycomb-like structure. In one embodiment, the third honeycomb-like structure is offset from the first honeycomb-like structure by approximately two-thirds of a diameter of a cylinder.

Figure 1D:
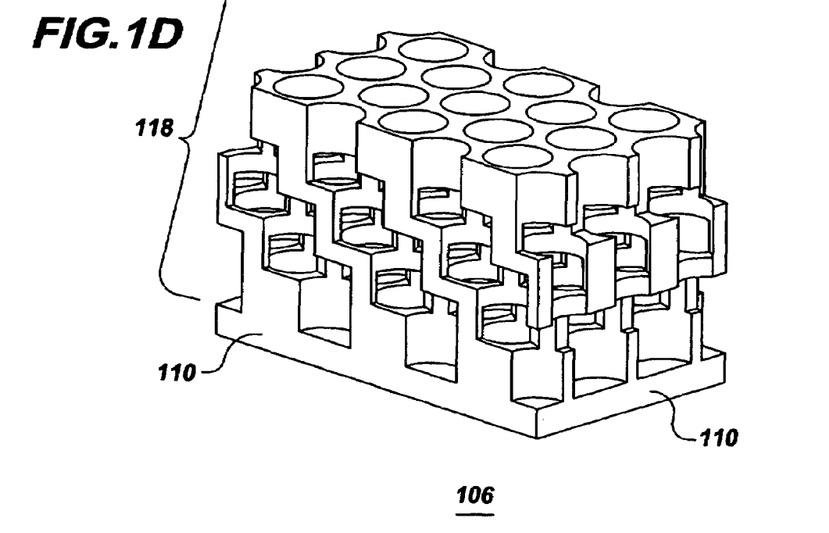
FIG. 1D is a perspective view of one embodiment of a 3D photonic bandgap device.

FIG. 1D is a perspective view of one embodiment of a 3D photonic bandgap device having one period. As shown in FIG. 1D, 3D PBG device 106 includes substrate 110 and PBG structure 118. Substrate 110 of FIG. 1D is substantially similar to substrate 110 of FIG. 1A, and thus, is not described hereinagain. PBG structure 118 of FIG. 1D is similar to PBG structure 116 of FIG. 1C, however, PBG structure 118 includes a fourth honeycomb-like structure over the third honeycomb-like structure of PBG structure 116 of FIG. 1C. The fourth honeycomb-like structure is not offset from the first honeycomb-like structure. Thus, the embodiment of FIG. 1D is a 4-layer, 3D photonic bandgap device.

One method of fabricating one embodiment of a 3D photonic bandgap device follows:
a) providing a substrate comprising a semiconductor layer over an insulator layer;
b) fabricating a 3D photonic bandgap structure having at least one period over the substrate.

One method of fabricating one embodiment of a 3D photonic bandgap device follows:
a) providing a substrate comprising a semiconductor layer over an insulator layer;
b) fabricating a first layer over the substrate, wherein the first layer has periodic regions of high index and low index materials;
c) fabricating a second layer over the first layer, wherein the second layer has periodic regions of high index and low index materials that are offset from the first layer;
d) fabricating a third layer over the second layer, wherein the third layer has periodic regions of high index and low index materials that are offset from the first layer and the second layer;
e) fabricating a fourth layer over the third layer, wherein the fourth layer has periodic regions of high index and low index materials that are offset from the second layer and the third layer, but not offset from the first layer.

Figure 2A:
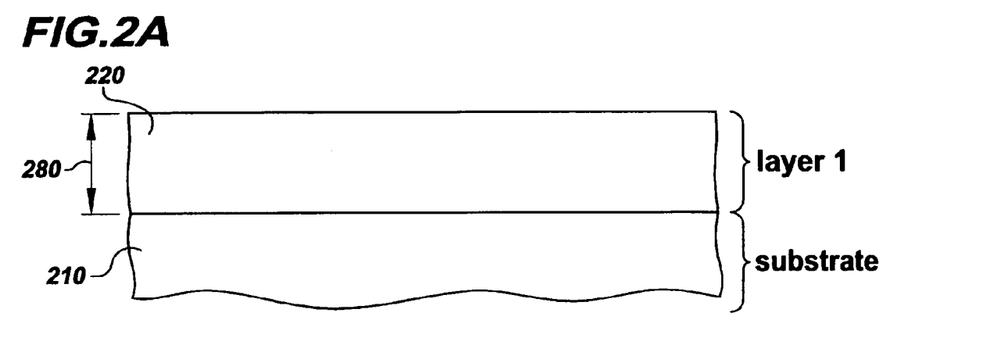
FIG. 2A is a side view of one embodiment of a 3D photonic bandgap device.

FIGS. 2A-2G are side views of one embodiment of a 3D photonic bandgap device in intermediate stages of fabrication. One method of fabricating an embodiment of a 3D PBG device (referred to hereinafter as the "monolithic fabrication method") is described below with regard to FIGS. 2A-2H. In a first event as shown in FIG. 2A, the monolithic fabrication method deposits first layer 220 over substrate 210. First layer 220 has a height 280 and comprises a semiconductor material. In one embodiment, the semiconductor material of first layer 220 comprises silicon. Substrate 210 comprises a semiconductor layer over an insulator layer. In one embodiment, the semiconductor layer of substrate 210 comprises silicon. In one embodiment, the insulator layer of substrate 210 comprises sapphire. In one embodiment, the insulator layer of substrate 210 comprises silicon dioxide.

Figure 2B:
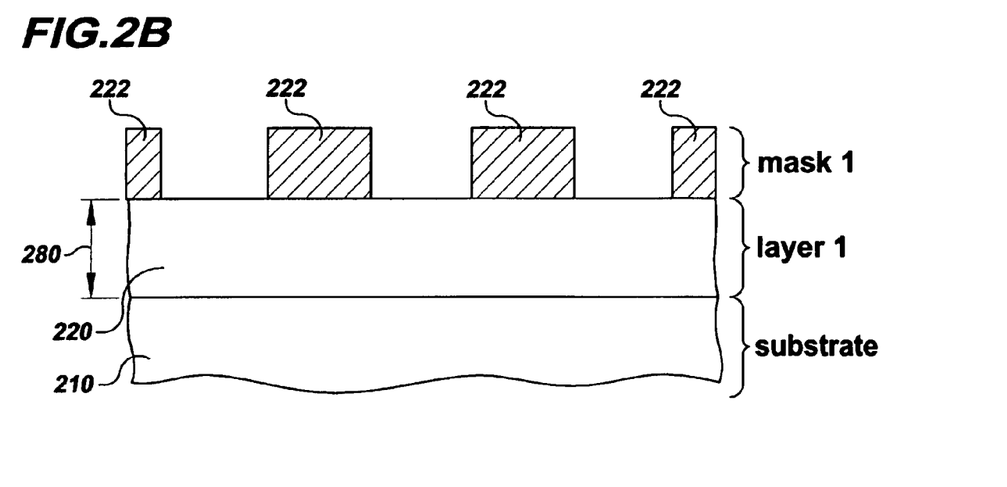
FIG. 2B is a side view of one embodiment of a 3D photonic bandgap device.
Figure 2C:
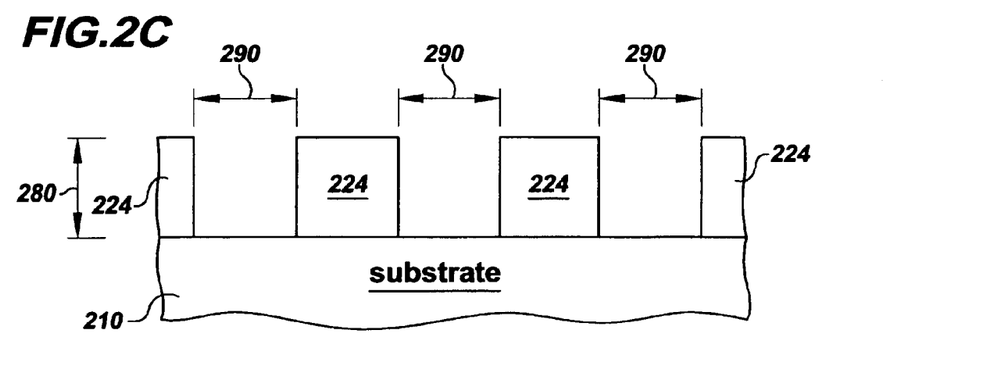
FIG. 2C is a side view of one embodiment of a 3D photonic bandgap device.
Figure 2D:
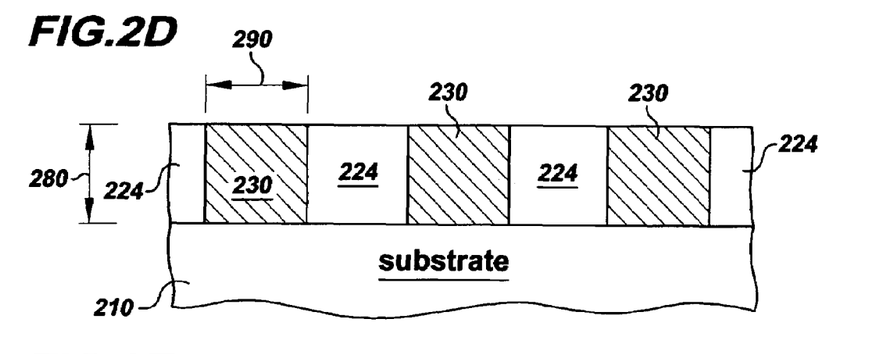
FIG. 2D is a side view of one embodiment of a 3D photonic bandgap device.

In a second event as shown in FIG. 2B, the monolithic fabrication method deposits, patterns and develops photoresist to form first photoresist mask 222 over first layer 220. In a third event as shown in FIG. 2C, the monolithic fabrication method selectively etches first layer 220 to form high index segments 224 having heights 280. High index segments 224 form apertures having diameters 290 and heights 280. In a fourth event as shown in FIG. 2D, the monolithic fabrication method deposits and planerizes a low index material over substrate 210 to form low index segments 230. In one embodiment, low index segments 230 comprise a material selected from the group consisting of silicon dioxide, oxide, polymer and a combination of two or more of the above. FIG. 2D is analogous to FIG. 1A.

Figure 2E:
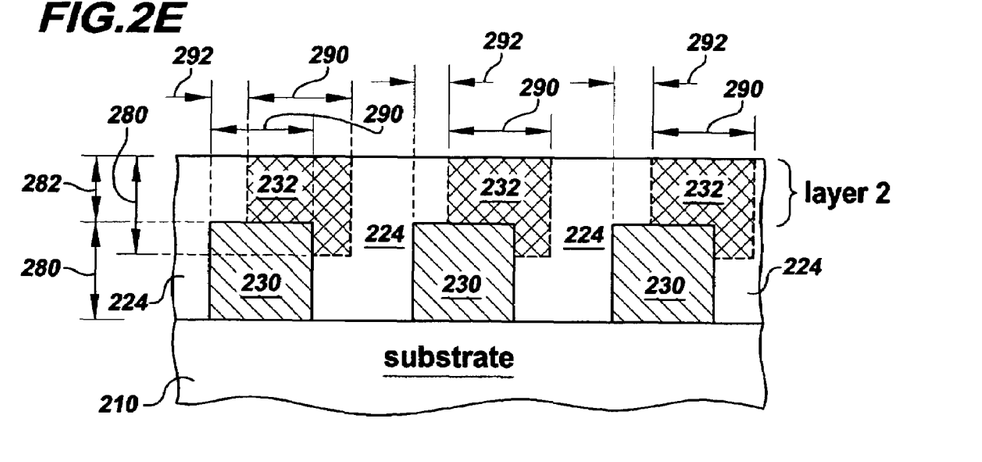
FIG. 2E is a side view of one embodiment of a 3D photonic bandgap device.

In a fifth event, the monolithic fabrication method deposits a second layer over high index segments 224 and low index segments 230. The second layer has a height 282, which is less than height 280. In one embodiment, height 282 is approximately equal to two-thirds of height 280. The second layer comprises semiconductor material such as silicon, germanium, silicon-germanium and similar semiconductor alloys. In a sixth event, the monolithic fabrication method deposits, patterns and develops a photoresist over the second layer. In a seventh event as shown in FIG. 2E, the monolithic fabrication method selectively etches the second layer and high index segments 224 to form apertures 232. The semiconductor material of the second layer increments high index segments 224. Apertures 232 have diameters 290. Apertures 232 are offset from low index segments 230 by offset 292. Offset 292 is in at least one direction. In one embodiment, offset 292 is approximately equal to one-third of diameter Apertures 232 are selectively etched into high index segments 224 to a depth approximately equal to height 280.

Figure 2F:
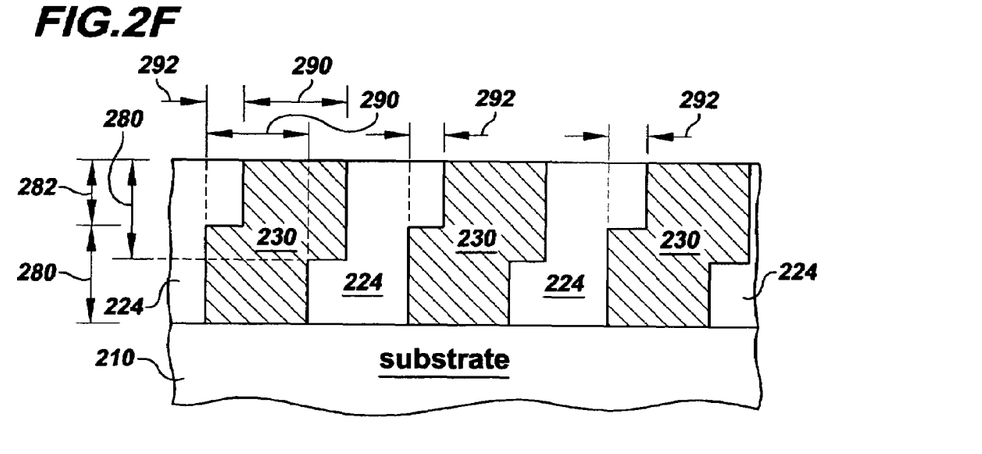
FIG. 2F is a side view of one embodiment of a 3D photonic bandgap device.
Figure 2G:
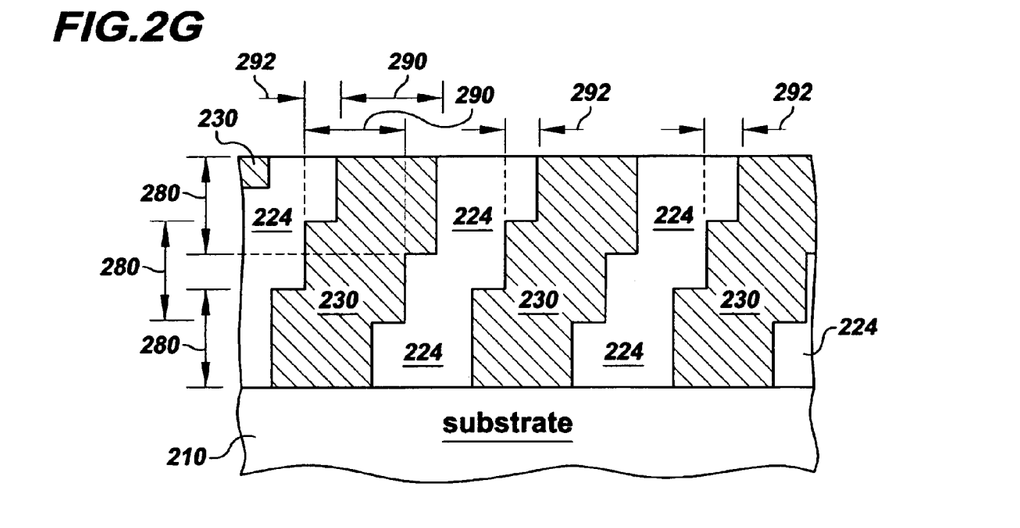
FIG. 2G is a side view of one embodiment of a 3D photonic bandgap device.

In an eighth event as shown in FIG. 2F, the monolithic fabrication method deposits and planerizes a low index material to form low index segments 230. In one embodiment, low index segments 230 comprise a material selected from the group consisting of silicon dioxide, oxide, polymer and a combination of two or more of the above. FIG. 2F is analogous to FIG. 1B. In a ninth event, the monolithic fabrication method repeats the above fifth through eighth events. Specifically, the monolithic fabrication method deposits a third layer over high index segments 224 and low index segments 230. The third layer has a height 282, which is less than height 280. In one embodiment, height 282 is approximately equal to two-thirds of height 280. The third layer comprises semiconductor material such as silicon, germanium, silicon-germanium and similar semiconductor alloys. The monolithic fabrication method deposits, patterns and develops a photoresist over the third layer. The monolithic fabrication method selectively etches 7 the third layer and high index segments 224 to form apertures, which have diameters 290 and are offset from the second layer low index segments by offset 292. Offset 292 is in at least one direction. In one embodiment, offset 292 is approximately equal to one-third of diameter 290. Apertures 232 are selectively etched into high index segments 224 to a depth approximately equal to height 280. The monolithic fabrication method deposits and planerizes a low index material to form low index segments 230. In one embodiment, low index segments 230 comprise a material selected from the group consisting of silicon dioxide, oxide, polymer and a combination of two or more of the above. FIG. 2G shows the 3D PBG device after the ninth event. FIG. 2G is analogous to FIG. 1C.

Figure 2H:
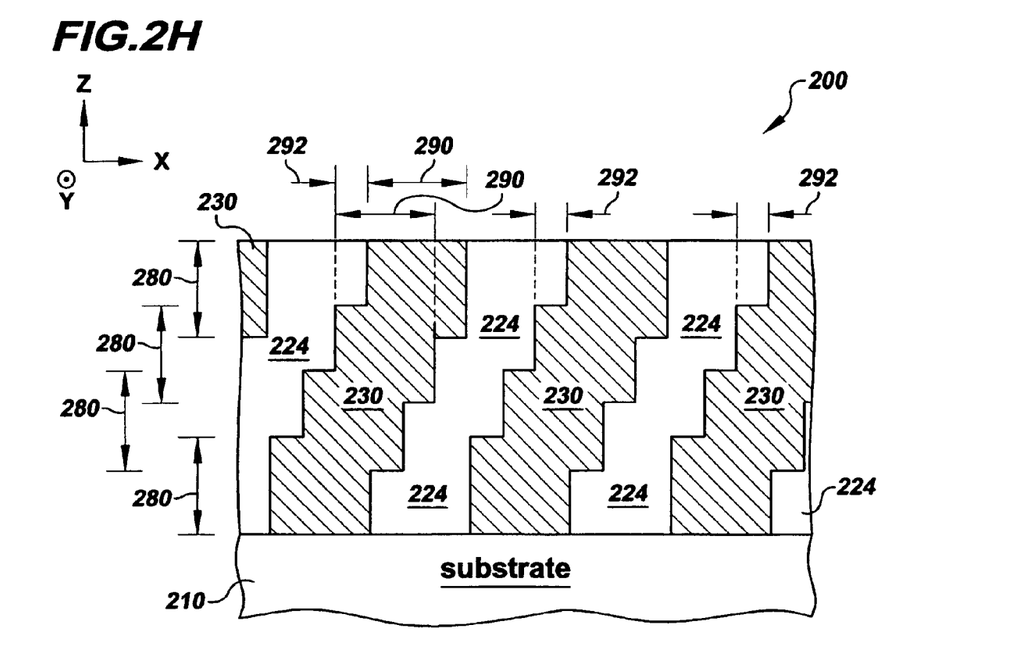
FIG. 2H is a side view of one embodiment of a 3D photonic bandgap device.

In a tenth event, the monolithic fabrication method repeats the above fifth through eighth events. Specifically, the monolithic fabrication method deposits a fourth layer over high index segments 224 and low index segments 230. The fourth layer has a height 282, which is less than height 280. In one embodiment, height 282 is approximately equal to two-thirds of height 280. The fourth layer comprises semiconductor material such as silicon, germanium, silicon-germanium and similar semiconductor alloys. The monolithic fabrication method deposits, patterns and develops a photoresist over the fourth layer. The monolithic fabrication method selectively etches the fourth layer and high index segments 224 to form apertures, which have diameters 290 and are offset from the third layer low index segments by offset 292. The apertures are offset from the second layer low index segments by approximately two times offset 292. The apertures are not offset from the first layer low index segments. In one embodiment, offset 292 is approximately equal to one-third of diameter 290. Apertures 232 are selectively etched into high index segments 224 to a depth approximately equal to height 280. The monolithic fabrication method deposits and planerizes a low index material to form low index segments 230. In one embodiment, low index segments 230 comprise a material selected from the group consisting of silicon dioxide, oxide, polymer and a combination of two or more of the above. FIG. 2H shows the 3D PBG device after the tenth event. FIG. 2H is a side view of one embodiment of a 3D photonic bandgap device 200 in SOI having one period. Thus, the embodiment of FIG. 2H is a 4-layer, 3D photonic bandgap device. FIG. 2H is analogous to FIG. 1D. In one embodiment, the monolithic fabrication method repeats the above first through tenth events until a desired number of periods is fabricated.

One method of fabricating an embodiment of a 3D PBG device (referred to hereinafter as the "Johnson patent method") is now described. In a first event, the Johnson patent method provides a substrate comprising a semiconductor layer over an insulator layer. In a second event, the Johnson patent method fabricates a 3D photonic bandgap structure having at least one period over the substrate in accordance with the methods described in the above incorporated Johnson patent. Such a 3D photonic bandgap structure is referred to hereinafter as a "rod and hole 3D photonic bandgap structure."

One method of fabricating one embodiment of a 3D photonic bandgap device follows:
 a) providing a substrate comprising a semiconductor layer over an insulator layer;
 b) monolithically fabricating an electronic component including the substrate and a 3D photonic bandgap structure having at least one period over the substrate.

Figure 3:
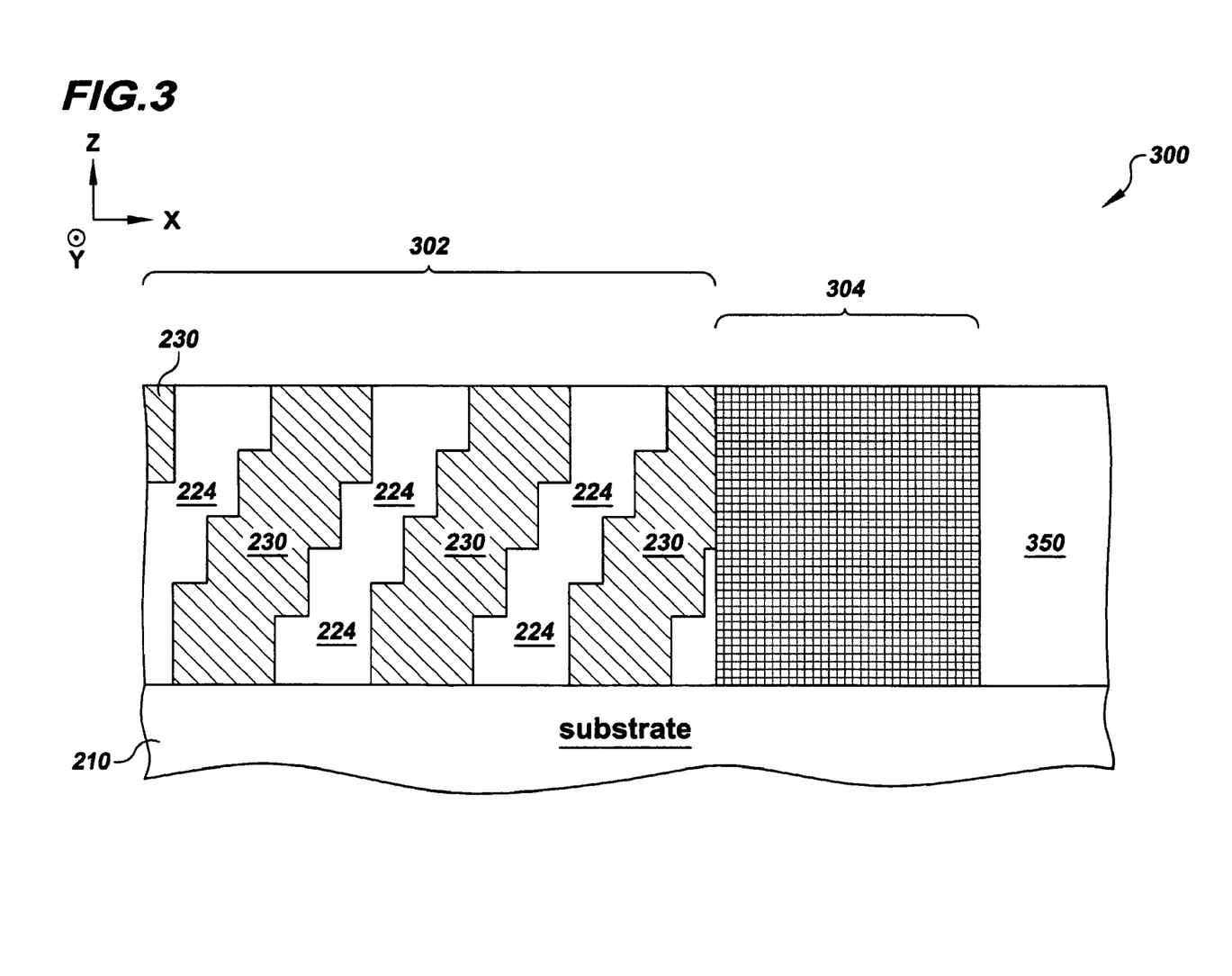
FIG. 3 is a side view of one embodiment of a 3D photonic bandgap device.

FIG. 3 is a side view of one embodiment of a 3D photonic bandgap device having one period. As shown in FIG. 3, 3D PBG device 300 includes 3D PBG structure 302, at least one electronic component 304, substrate 210 and medium 350. 3D PBG structure 302 over substrate 210 is substantially similar to 3D PBG device in SOI 200 of FIG. 2H, and thus, similar components are not described hereinagain. Exemplary electronic components of the at least one electronic component 304 include transistors, photodiodes, photodetectors, phototransistors and metal vias. Substrate 210 is described above with regard to FIG. 2A. Medium 350 may comprise metal, semiconductor or insulator material. In one embodiment, medium 350 comprises semiconductor material. In one embodiment, 3D PBG structure 302 and at least one electronic component 304 are monolithically integrated over substrate 210. In one embodiment, 3D PBG device 300 is monolithically fabricated.

Figure 4A:
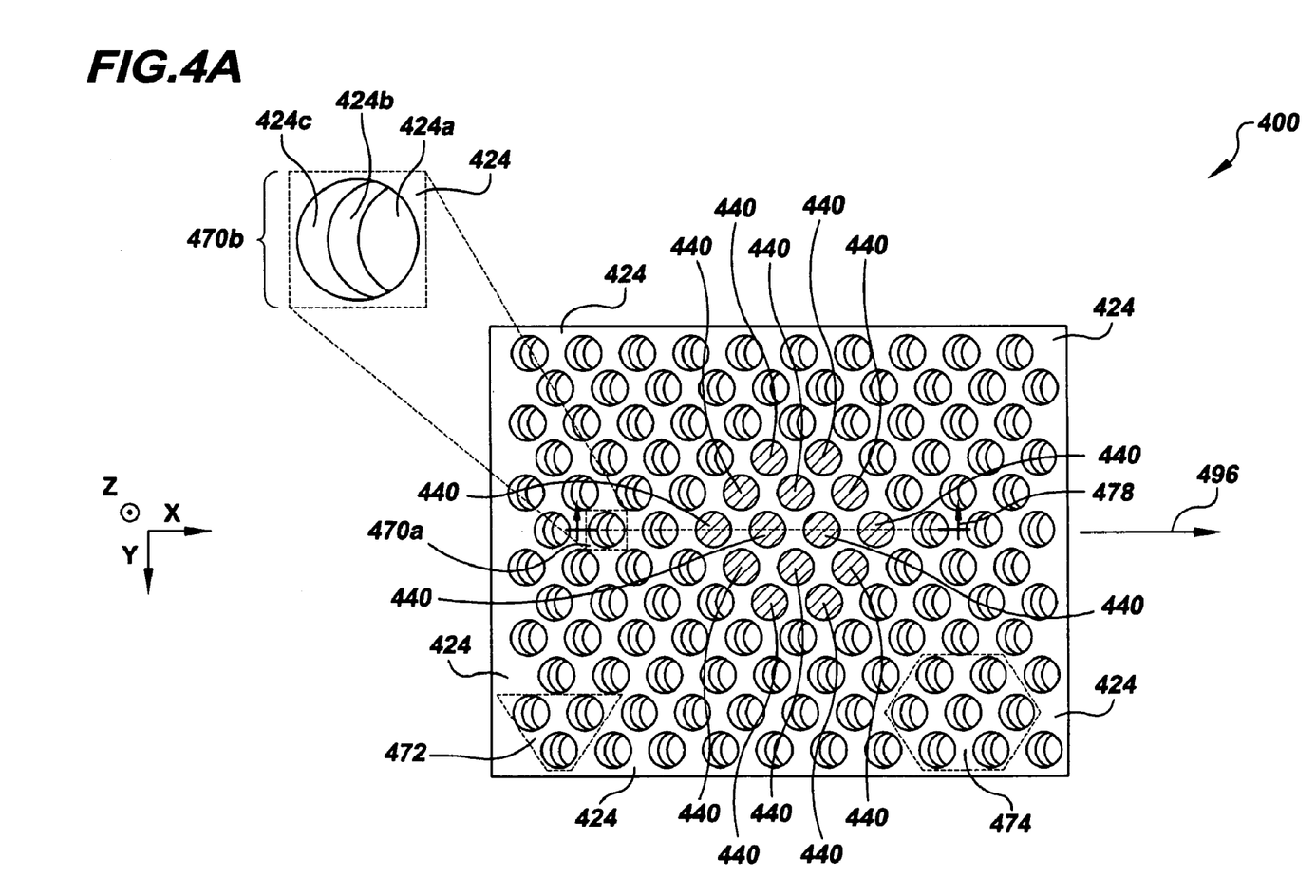
FIG. 4A is a top view of one embodiment of a 3D photonic bandgap device.
Figure 4B:
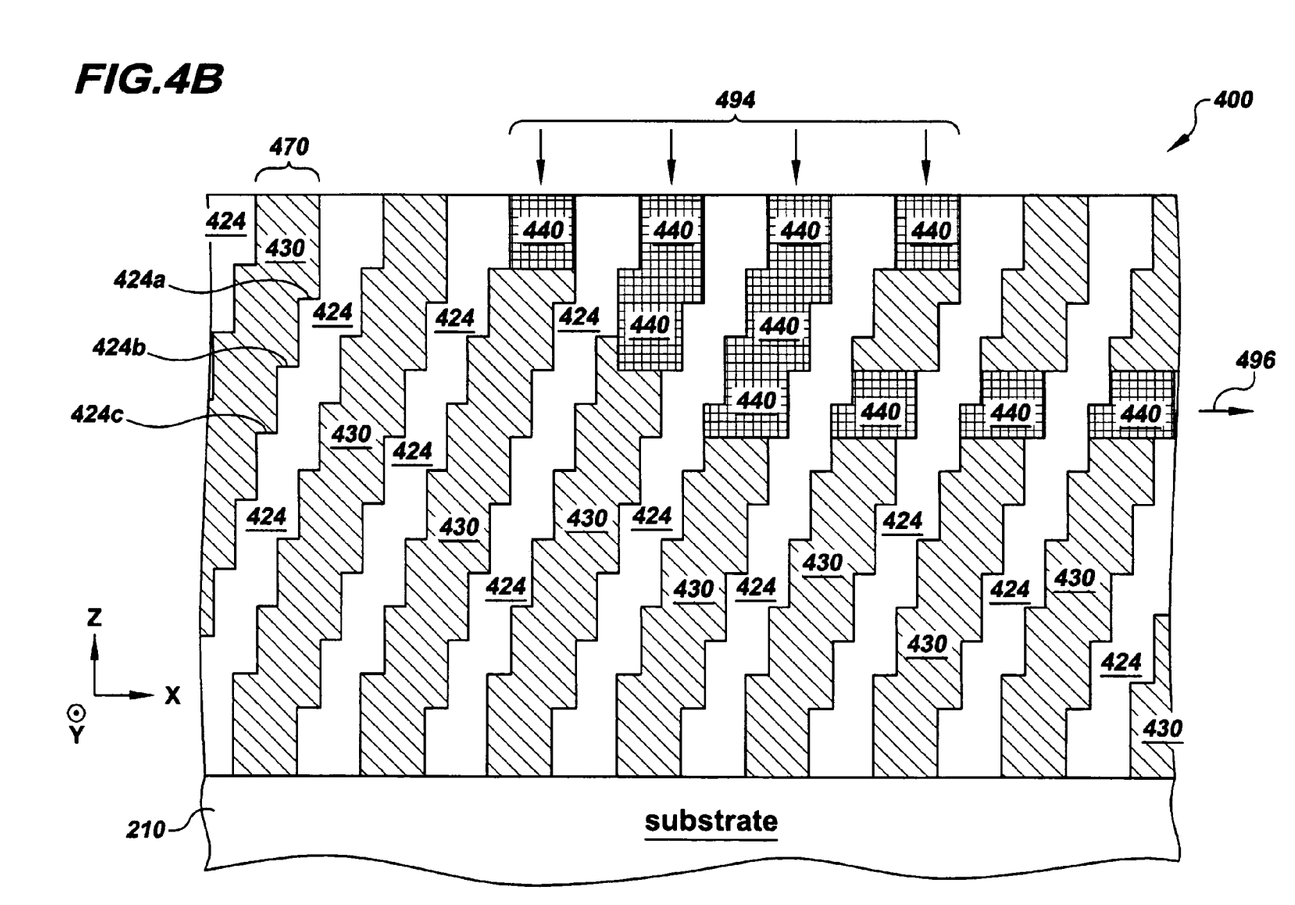
FIG. 4B is a side view of one embodiment of a 3D photonic bandgap device.

FIGS. 4A and 4B are views of an embodiment of a 3D photonic bandgap device in a funnel waveguide configuration. FIG. 4A is a top view of one embodiment of a 3D photonic bandgap device. FIG. 4B is a side view of one embodiment of a 3D photonic bandgap device as viewed across cross-section line 478 of FIG. 4A. As shown in FIGS. 4A and 4B, 3D PBG device 400 includes high index regions 424, low index regions 430 (not labeled in FIG. 4A), crystal defect regions 440 and substrate 210 (not shown in FIG. 4A). In the 3D photonic bandgap device embodiment of FIGS. 4A and 4B, low index regions 430 comprise air. Thus, as shown in FIG. 4A with reference to expanded view area 470b, high index regions 424a, 424b and 424c are visible despite having different depths relative to a top surface of 3D PBG 400. Expanded view area 470b is an expanded view of area 470a. As shown in FIG. 4B, high index region 424a has a depth less than high index region 424b, which has a depth less than high index region 424c. High index regions 424 and low index regions 430 are analogous to high index segments 224 and low index segments 230, respectively, which are described above with reference to FIGS. 2D-2H, and thus, are not described hereinagain.

Crystal defect regions 440 are regions that only allow specific frequencies of light to propagate. Crystal defect regions 440 can be fabricated by intentionally introducing defects along a photonic crystal. As shown in FIG. 4B, crystal defect regions 440 taper to form a funnel waveguide configuration coupled to a horizontal waveguide. Specifically, crystal defect regions 440 taper from a large surface area of crystal defect regions 440 to a small surface area of crystal defect regions 440 with respect to an X-Y plane moving along the negative Z axis until coupling with a horizontal waveguide formed from crystal defect regions 440. As shown in FIG. 4B, light rays 494 strike 3D PBG device 400 incident to a top surface of 3D PBG device 400. Light rays 494 propagate through crystal defect regions 440 because light rays 494 have the specific frequencies that are allowed to propagate through crystal defect regions 440. Crystal regions 440 funnel light rays 494. Light rays 494 exit 3D PBG device 400 as represented by light ray 496.

In one embodiment, 3D PGB device 400 comprises a plurality of triangular patterns of apertures. An exemplary triangular pattern 472 is shown on FIG. 4A. In one embodiment, 3D PGB device 400 comprises a plurality of center-faced hexagonal patterns of apertures. An exemplary center-faced hexagonal pattern 474 is shown on FIG. 4A.

Figure 5:
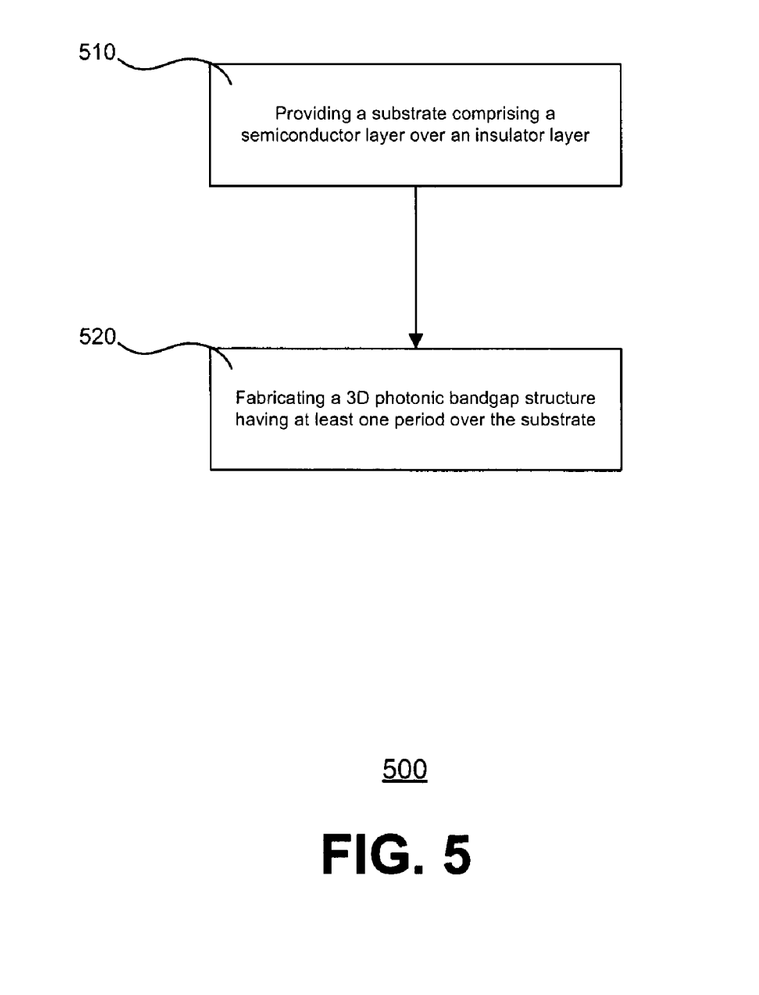
FIG. 5 is a flowchart of one embodiment of a method for a 3D photonic bandgap device.
Figure 6:
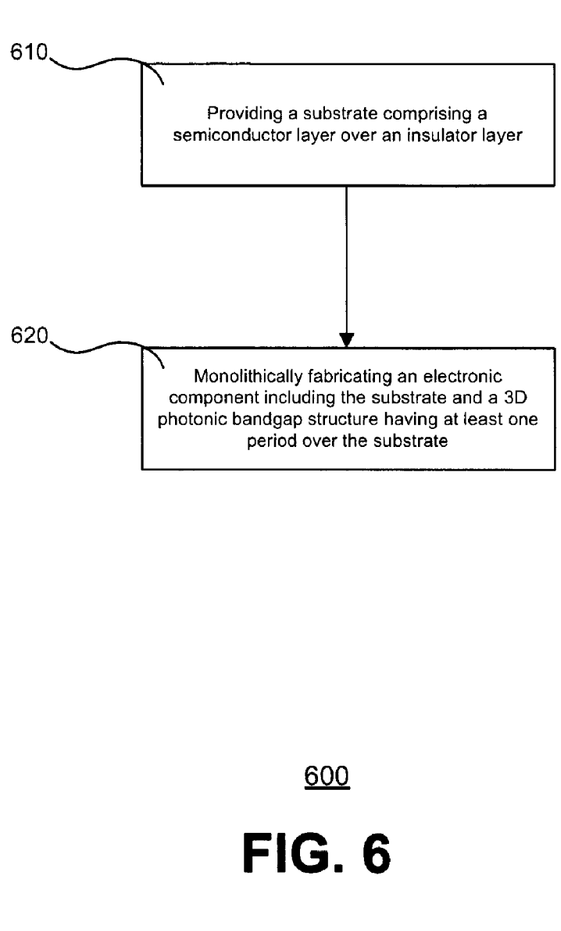
FIG. 6 is a flowchart of one embodiment of a method for a 3D photonic bandgap device.
Figure 7:
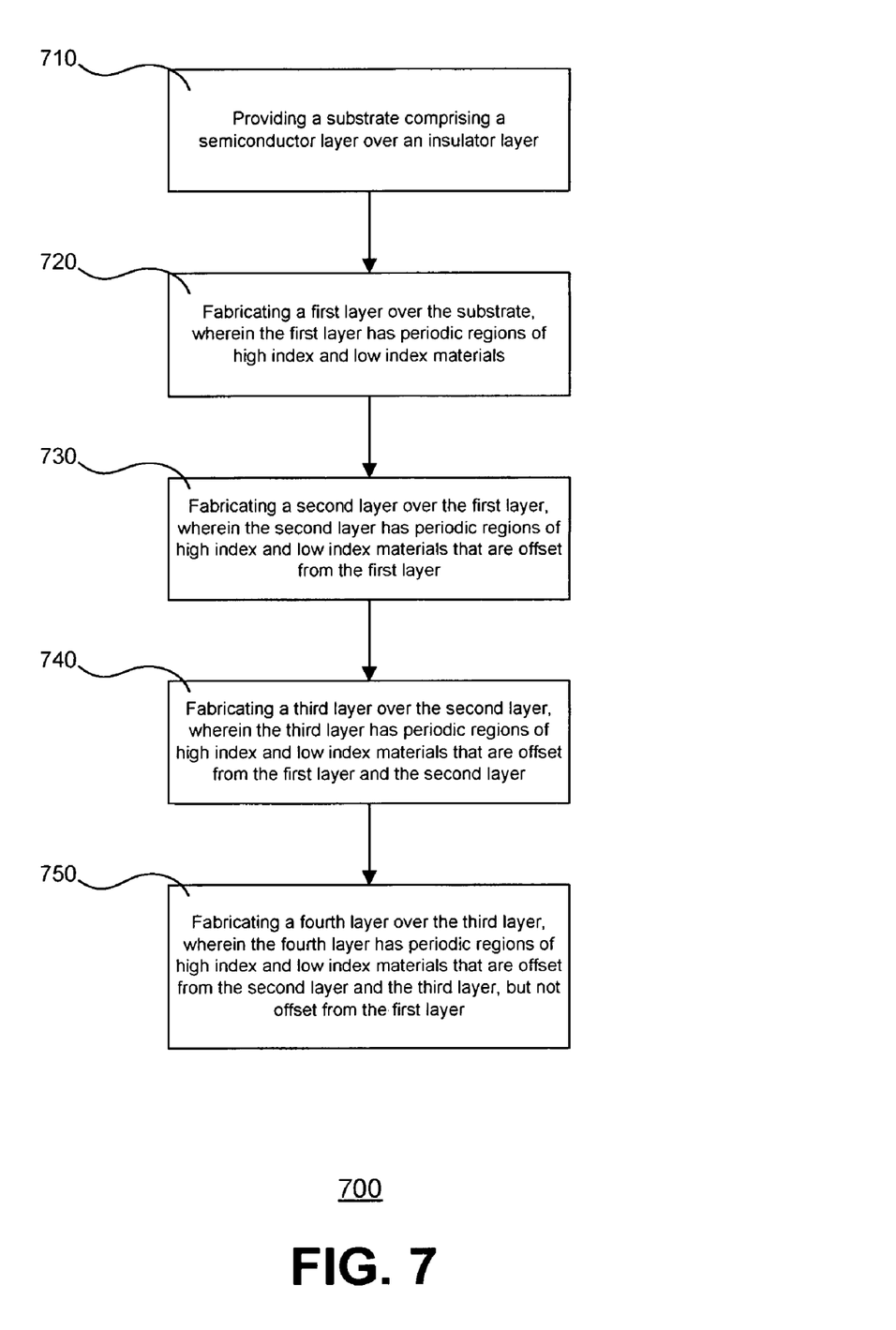
FIG. 7 is a flowchart of one embodiment of a method for a 3D photonic bandgap device.

FIGS. 5-7 are flowcharts of exemplary methods for fabricating a 3D photonic bandgap device. Certain details and features have been left out these flowcharts that are apparent to a person of ordinary skill in the art. For example, a box may consist of one or more sub-boxes or may involve specialized equipment or materials, as known in the art. While boxes of these flowcharts are sufficient to describe embodiments for fabricating a 3D photonic bandgap device, other embodiments of the invention may utilize boxes different from those shown in these flowcharts.

FIG. 5 is a flowchart of one embodiment of a method for a 3D photonic bandgap device. Referring to FIG. 5, at BOX 510 of flowchart 500, the method provides a substrate comprising a semiconductor layer over an insulator layer. In one embodiment, the method provides a substrate comprising a silicon layer over an insulator layer. In one embodiment, the method provides a substrate comprising a germanium layer over an insulator layer. In one embodiment, the method provides a substrate comprising a silicon-germanium layer over an insulator layer. In one embodiment, the method provides a substrate comprising a semiconductor layer over a quartz layer. In one embodiment, the method provides a substrate comprising a semiconductor layer over a silicon dioxide layer. In one embodiment, the method provides a substrate comprising a semiconductor layer over a sapphire layer. After BOX 510, the method of flowchart 500 of FIG. 5 proceeds to BOX 520.

Referring to FIG. 5, at BOX 520 of flowchart 500, the method fabricates a 3D photonic bandgap structure having at least one period over the substrate. In one embodiment, the method fabricates a 3D photonic bandgap structure comprising a honeycomb-like structure. In one embodiment, the method fabricates a 3D photonic bandgap structure having high index regions and low index regions. In one embodiment, the method fabricates a 3D photonic bandgap structure having low index regions comprising air. In one embodiment, the method fabricates a 3D photonic bandgap structure having low index regions comprising silicon dioxide. In one embodiment, the method fabricates a 3D photonic bandgap structure having high index regions comprising silicon. In one embodiment, the method fabricates a 3D photonic bandgap structure having high index regions comprising germanium. In one embodiment, the method fabricates a 3D photonic bandgap structure having high index regions comprising silicon-germanium. The method of flowchart 500 of FIG. 5 terminates at BOX 520.

FIG. 6 is a flowchart of one embodiment of a method for a 3D photonic bandgap device. Referring to FIG. 6, at BOX 610 of flowchart 600, the method provides a substrate comprising a semiconductor layer over an insulator layer. In one embodiment, the method provides a substrate comprising a silicon layer over an insulator layer. In one embodiment, the method provides a substrate comprising a germanium layer over an insulator layer. In one embodiment, the method provides a substrate comprising a silicon-germanium layer over an insulator layer. In one embodiment, the method provides a substrate comprising a semiconductor layer over a quartz layer. In one embodiment, the method provides a substrate comprising a semiconductor layer over a silicon dioxide layer. In one embodiment, the method provides a substrate comprising a semiconductor layer over a sapphire layer. After BOX 610, the method of flowchart 600 of FIG. 6 proceeds to BOX 620.

Referring to FIG. 6, at BOX 620 of flowchart 600, the method monolithically fabricates an electronic component including the substrate and a 3D photonic bandgap structure having at least one period over the substrate. In one embodiment, the method monolithically fabricates an electronic component including the substrate and a 3D photonic bandgap structure comprising a honeycomb-like structure. In one embodiment, the method monolithically fabricates an electronic component including the substrate and a 3D photonic bandgap structure having high index regions and low index regions. In one embodiment, the method monolithically fabricates an electronic component including the substrate and a 3D photonic bandgap structure having low index regions comprising air. In one embodiment, the method monolithically fabricates a 3D photonic bandgap structure having low index regions comprising silicon dioxide. In one embodiment, the method monolithically fabricates an electronic component including the substrate and a 3D photonic bandgap structure having high index regions comprising silicon. In one embodiment, the method monolithically fabricates an electronic component including the substrate and a 3D photonic bandgap structure having high index regions comprising germanium. In one embodiment, the method monolithically fabricates an electronic component including the substrate and a 3D photonic bandgap structure having high index regions comprising silicon-germanium. The method of flowchart 600 of FIG. 6 terminates at BOX 620.

FIG. 7 is a flowchart of one embodiment of a method for a 3D photonic bandgap device. Referring to FIG. 7, at BOX 710 of flowchart 700, the method provides a substrate comprising a semiconductor layer over an insulator layer. In one embodiment, the method provides a substrate comprising a silicon layer over an insulator layer. In one embodiment, the method provides a substrate comprising a germanium layer over an insulator layer. In one embodiment, the method provides a substrate comprising a silicon-germanium layer over an insulator layer. In one embodiment, the method provides a substrate comprising a semiconductor layer over a quartz layer. In one embodiment, the method provides a substrate comprising a semiconductor layer over a silicon dioxide layer. In one embodiment, the method provides a substrate comprising a semiconductor layer over a sapphire layer. After BOX 710, the method of flowchart 700 of FIG. 7 proceeds to BOX 720.

Referring to FIG. 7, at BOX 720 of flowchart 700, the method fabricates a first layer over the substrate, wherein the first layer has periodic regions of high index and low index materials. In one embodiment, the method fabricates a first layer having low index regions comprising air. In one embodiment, the method fabricates a first layer having low index regions comprising silicon dioxide. In one embodiment, the method fabricates a first layer having high index regions comprising silicon. In one embodiment, the method fabricates a first layer having high index regions comprising germanium. In one embodiment, the method fabricates a first layer having high index regions comprising silicon-germanium. After BOX 720, the method of flowchart 700 of FIG. 7 proceeds to BOX 730.

Referring to FIG. 7, at BOX 730 of flowchart 700, the method fabricates a second layer over the first layer, wherein the second layer has periodic regions of high index and low index materials that are offset from the first layer. In one embodiment, the method fabricates a second layer having low index regions comprising air. In one embodiment, the method fabricates a second layer having low index regions comprising silicon dioxide. In one embodiment, the method fabricates a second layer having high index regions comprising silicon. In one embodiment, the method fabricates a second layer having high index regions comprising germanium. In one embodiment, the method fabricates a second layer having high index regions comprising silicon-germanium. After BOX 730, the method of flowchart 700 of FIG. 7 proceeds to BOX 740.

Referring to FIG. 7, at BOX 740 of flowchart 700, the method fabricates a third layer over the second layer, wherein the third layer has periodic regions of high index and low index materials that are offset from the first layer and second layer. In one embodiment, the method fabricates a third layer having low index regions comprising air. In one embodiment, the method fabricates a third layer having low index regions comprising silicon dioxide. In one embodiment, the method fabricates a third layer having high index regions comprising silicon. In one embodiment, the method fabricates a third layer having high index regions comprising germanium. In one embodiment, the method fabricates a third layer having high index regions comprising silicon-germanium. After BOX 740, the method of flowchart 700 of FIG. 7 proceeds to BOX 750.

Referring to FIG. 7, at BOX 750 of flowchart 700, the method fabricates a fourth layer over the third layer, wherein the fourth layer has periodic regions of high index and low index materials that are offset from the second layer and third layer, but not offset from the first layer. In one embodiment, the method fabricates a fourth layer having low index regions comprising air. In one embodiment, the method fabricates a fourth layer having low index regions comprising silicon dioxide. In one embodiment, the method fabricates a fourth layer having high index regions comprising silicon. In one embodiment, the method fabricates a fourth layer having high index regions comprising germanium. In one embodiment, the method fabricates a fourth layer having high index regions comprising silicon-germanium. The method of flowchart 700 of FIG. 7 terminates at BOX 750.

Figure 8A:
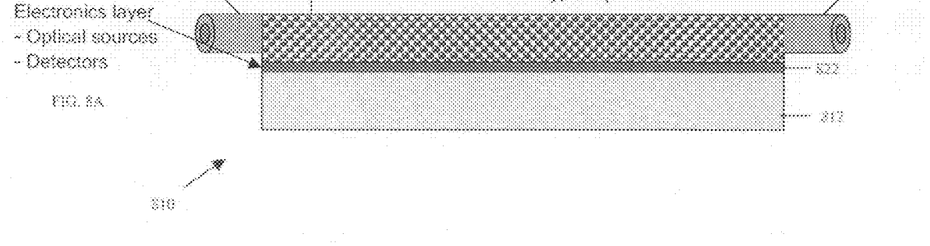
FIG. 8A is a side view of an embodiment of the electronic/photonic (E/P) bandgap device.

FIG. 8A is a side view of an embodiment of the electronic/photonic (E/P) bandgap device. The E/P bandgap device includes a substrate, an electronics layer and an optical bus layer having at least one 3D photonic bandgap structure having at least one period. As shown in FIG. 8A, E/P bandgap device 810 includes substrate 812, electronics layer 822 and optical bus layer 814. Optical signal input 816 is designed to receive optical signals and input optical signals to optical bus layer 814. Optical signal output 818 is designed to receive optical signals from optical bus layer 814 and input optical signals to other components (not shown in FIGS.). Substrate 812 comprises a semiconductor layer over an insulator layer. Exemplary semiconductor layers include silicon, germanium, silicon-germanium and similar semiconductor alloys. Exemplary insulator layers include quartz, silicon dioxide and sapphire. In one embodiment, substrate 812 includes a silicon layer over an insulator layer. In one embodiment, substrate 812 includes a silicon layer over a quartz layer. In one embodiment, substrate 812 includes a silicon layer over a sapphire layer. Electronics layer 822 is operatively coupled to substrate 812. Electronics layer 822 comprises at least one electronic component. Exemplary electronic components of electronics layer 822 include optical sources, detectors, transistors, photodiodes, photodetectors, phototransistors and metal vias. Optical bus layer 814 comprises at least a portion of a 4-layer, 3D photonic bandgap device such as the embodiment described above and shown in FIGS. 1D, 2H. Optical bus layer 814 may further comprise other components (described below with reference to FIG. 8B).

Figure 8B:
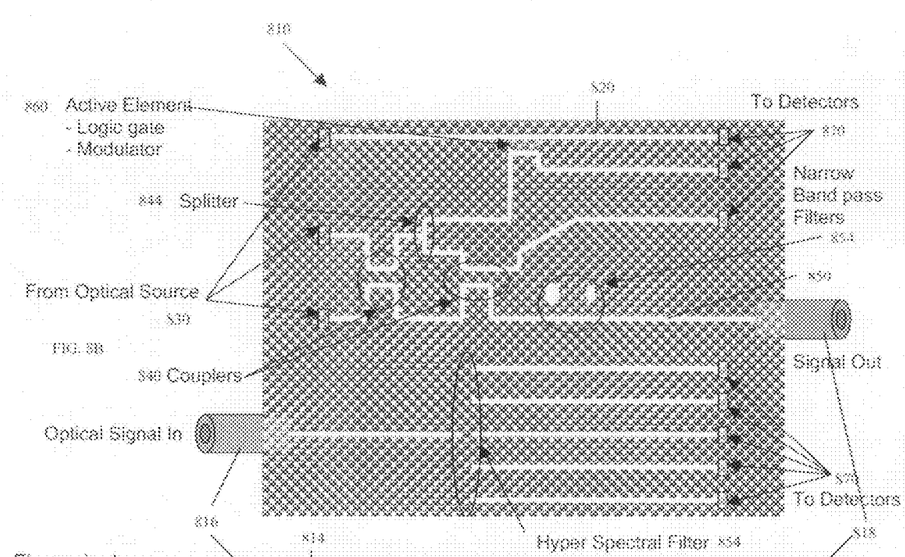
FIG. 8B is a top view of an embodiment of the E/P bandgap device of FIG. 8A.

FIG. 8B is a top view of an embodiment of the E/P bandgap device of FIG. 8A. Optical bus layer 814 comprises at least a portion of a 4-layer, 3D photonic bandgap device. As shown in FIG. 8B, optical bus layer 814 may further comprise optical sources 830, couplers 840, splitters 844, waveguides 850, filters 854, active elements 860 (e.g., logic gates and modulators) and detectors 870. Components of optical bus layer 814 may be operatively coupled with other components of optical bus layer 814 and/or electronics layer 822 of FIG. 8A.

Figure 8C:
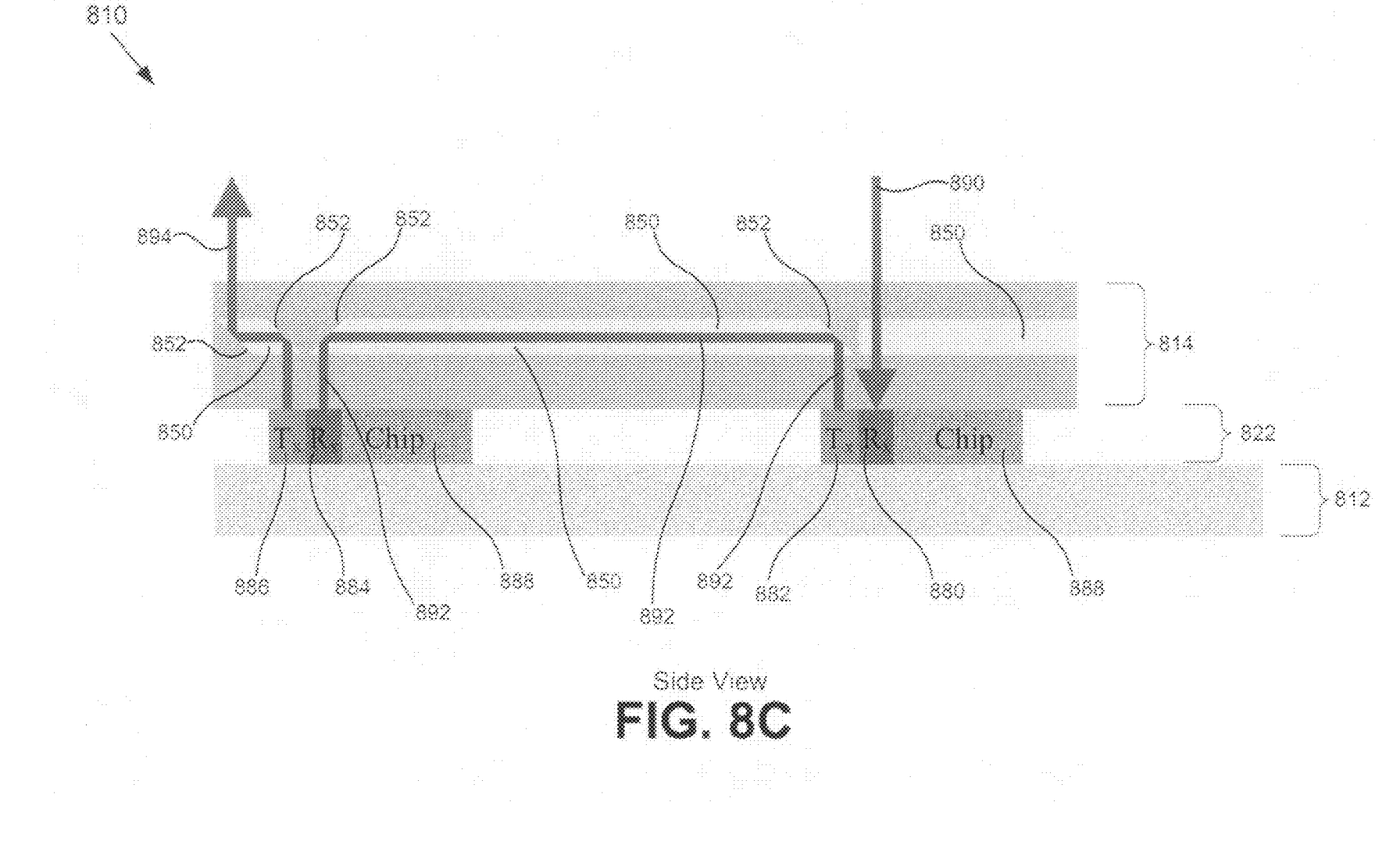
FIG. 8C is a side view of an embodiment of an E/P bandgap device.

FIG. 8C is a side view of an embodiment of an E/P bandgap device. The E/P bandgap device of FIG. 8C is a photonic transceiver embodiment. An optical bus layer provides an optical interface between transmit and receive modules. FIG. 8C is similar to FIGS. 8A and 8B, and thus, similar components are not described again. As shown in FIG. 8C, E/P bandgap device 810 comprises optical bus layer 814, electronics layer 822 and substrate 812. Optical bus layer 814 can be fabricated using silicon-on-semiconductor (SOS), silicon-on-insulator (SOI) or silicon-on-quartz (SOQ) methods, which can provide data connections between individual chips (e.g., chips 888). Optical bus layer 814 comprises at least one 4-layer, 3D photonic bandgap device. Optical bus layer 814 comprises waveguides 850 and beam directing portions 852. Examples of beam directing portions 852 include mirrors and semi-reflective surfaces. Optical bus layer 814 may further comprise passive optical elements such as multiplexers, demultiplexers, mirrors, coupling optics and splitters. In one embodiment of E/P bandgap device 810 of FIG. 8C, at least one optical bus layer is situated over optical bus layer 814. Thus, multiple functions can be provided. As shown in FIG. 8C, electronics layer 822 comprises chips 888, receivers 880, 884 and transmitters 882, 886.

An exemplary operation of E/P bandgap device 810 is now described. Input light signal 890 (shown in FIG. 8C as a vertical arrow) is transmitted through optical bus layer 814 of E/P bandgap device 810. Receiver 880 of electronics layer 822 receives input light signal 890. Transmitter 882 of electronics layer 822 transmits light signal 892 to optical bus layer 814. Light signal 892 follows a path along portions of waveguides 850 and beam directing portions 852 within optical bus layer 814. Receiver 884 of electronics layer 822 receives light signal 892. Transmitter 886 of electronics layer 822 transmits output light signal 894 to optical bus layer 814. Output light signal 894 follows a path along portions of waveguides 850 and beam directing portions 852 within optical bus layer 814. Output light signal 894 outputs E/P bandgap device 810 via optical bus layer 814.

Figure 9:
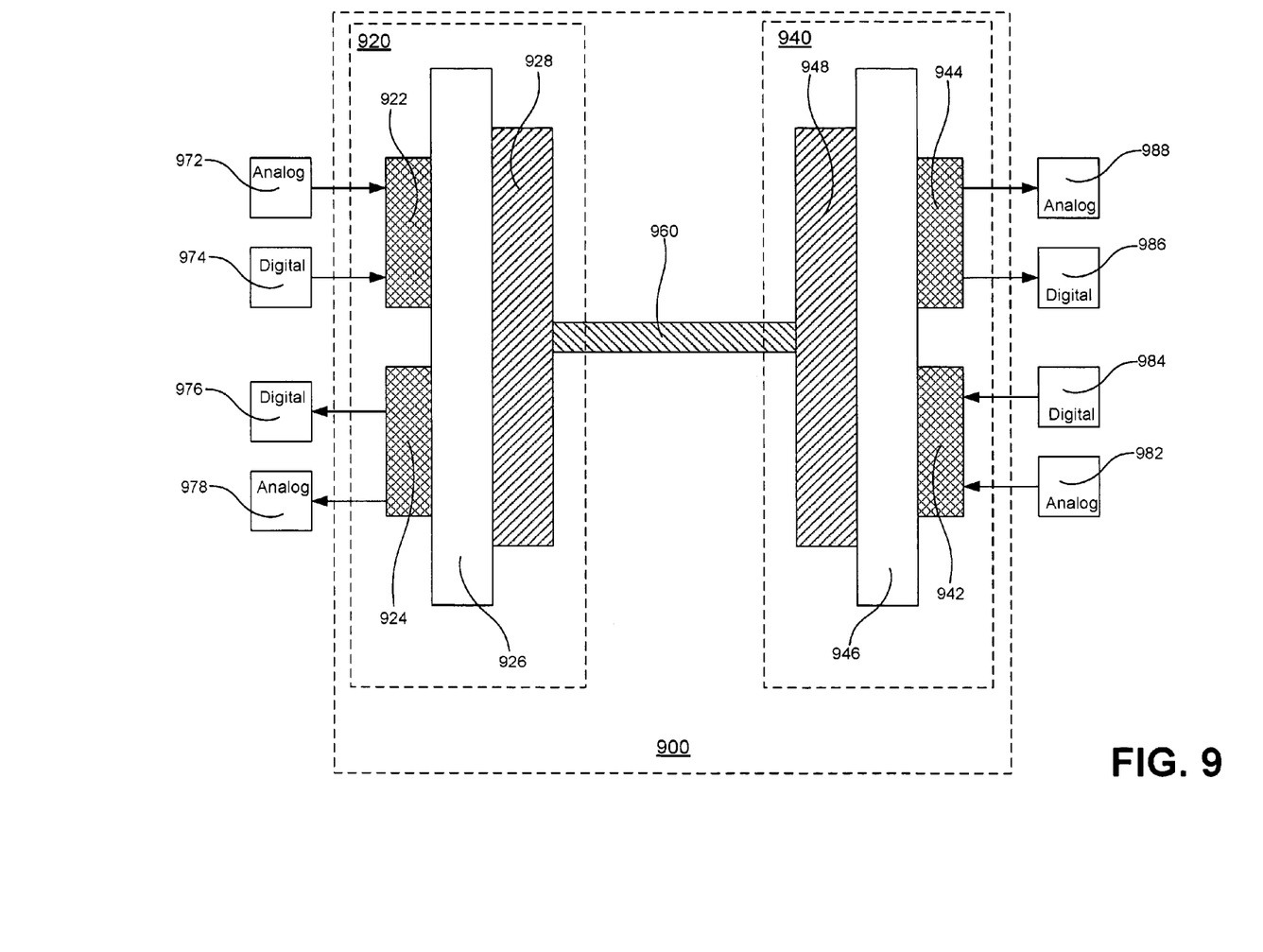
FIG. 9 is a block diagram of an exemplary implementation of one embodiment of an E/P bandgap device in a photonic transceiver configuration.

FIG. 9 is a block diagram of an exemplary implementation of one embodiment of an E/P bandgap device in a photonic transceiver configuration. The exemplary implementation of FIG. 9 uses E/P bandgap devices having transparent substrates, analog circuits, photodetectors and digital circuits to transmit and receive multi-signal communication channels (e.g., analog, optical and digital) in parallel. As shown in FIG. 9, photonic transceiver 900 includes E/P bandgap device 920, E/P bandgap device 940 and optical communication medium 960. Optical communication medium 960 provides operative coupling between E/P bandgap device 920 and E/P bandgap device 940 so that light can be transmitted and received between them. Exemplary optical communication mediums 960 include fiber ribbon cables, optical waveguides and air. E/P bandgap device 920 comprises at least one 4-layer, 3D photonic bandgap device. E/P bandgap device 920 includes transmit array 922, receive array 924, transparent substrate 926 and coupler 928. Transmit array 922 and receive array 924 are monolithically integrated on transparent substrate 926. Transmit array 922 is capable of receiving analog and digital signals from analog source 972 and digital source 974, respectively, via communication channels and converting the signals to optical signals. In one embodiment, analog source 972 comprises an analog transmitter and digital source 974 comprises a digital transmitter. Transmit array 922 is capable of transmitting optical signals through transparent substrate 926 to coupler 928, which are eventually input to receive array 944 of E/P bandgap device 940. Receive array 924 is capable of receiving optical signals from coupler 928 through transparent substrate 926 and converting the signals to analog and/or digital signals. Receive array 924 is capable of transmitting analog and digital signals to analog receiver 978 and digital receiver 976, respectively, via communication channels.

E/P bandgap device 940 comprises at least one 4-layer, 3D photonic bandgap device. E/P bandgap device 940 includes transmit array 942, receive array 944, transparent substrate 946 and coupler 948. Transmit array 942 and receive array 944 are monolithically integrated on transparent substrate 946. Transmit array 942 is capable of receiving analog and digital signals from analog source 982 and digital source 984, respectively, via communication channels and converting the signals to optical signals. In one embodiment, analog source 982 comprises an analog receiver. Transmit array 942 is capable of transmitting optical signals through transparent substrate 946 to coupler 948, which are eventually input to receive array 924 of E/P bandgap device 920. Receive array 944 is capable of receiving optical signals from coupler 948 through transparent substrate 946 and converting the signals to analog and/or digital signals. Receive array 944 is capable of transmitting analog and digital signals to analog receiver 988 and digital receiver 986, respectively, via communication channels. In one embodiment, analog receiver 988 comprises an analog transmitter.

In one embodiment, photonic transceiver 900 uses optical interconnects of an optical fiber ribbon cable to interface E/P bandgap device with on-chip detectors and mixed-signal electronics. In one embodiment, photonic transceiver 900 is used for multi-functional rf analog optical links and high-capacity digital data transmission for very short distance interconnections. Thus, photonic transceiver 900 can implement wideband microwave/millimeter wave antenna remoting and data communication in a parallel manner, which allows data and rf signals to be transmitted on separate channels as well as received on separate channels.

We claim:

1. An apparatus, comprising:
   a substrate having a semiconductor layer over an insulator layer;
   an electronics layer operatively coupled to said substrate and comprising at least one electronic component;
   an optical bus layer operatively coupled to said electronics layer, comprising:
   at least one 3D photonic bandgap structure having at least one period operatively coupled to said electronics layer and comprising a plurality of honeycomb-like structures having a plurality of high index regions and a plurality of low index regions, wherein said plurality of honeycomb-like structures comprises at least four honeycomb-like structures layered over each other, wherein a second honeycomb-like structure is offset from a first honeycomb-like structure, wherein a third honeycomb-like structure is offset from a second honeycomb-like structure, and wherein a fourth honeycomb-like structure is not offset from said first honeycomb-like structure;
   wherein said 3D photonic bandgap structure and said electronics layer are monolithically integrated over said substrate.

2. The apparatus of claim 1, wherein said semiconductor layer comprises silicon.

3. The apparatus of claim 1, wherein said semiconductor layer comprises germanium.

4. The apparatus of claim 1, wherein said insulator layer comprises silicon dioxide.

5. The apparatus of claim 1, wherein said insulator layer comprises sapphire.

6. The apparatus of claim 1, wherein said 3D photonic bandgap structure comprises a rod and hole 3D photonic bandgap structure.

7. The apparatus of claim 1, wherein said plurality of high index regions comprises semiconductor material.

8. The apparatus of claim 1, wherein said plurality of low index regions comprises air.

9. The apparatus of claim 1, wherein said plurality of low index regions comprises silicon dioxide.

10. The apparatus of claim 1, wherein said second honeycomb-like structure is offset from said first honeycomb-like structure by approximately one-third of a diameter of an aperture of said first honeycomb-like structure, wherein said third honeycomb-like structure is offset from said second honeycomb-like structure by approximately one-third of said diameter of said aperture, and wherein a fourth honeycomb-like structure is not offset from said first honeycomb-like structure.

11. The apparatus of claim 1, wherein said at least one electronic component comprises electronic components selected from the group consisting of transistors, photodiodes, photodetectors, phototransistors and a combination of two or more of the above electronic components.

12. The apparatus of claim 1, wherein said apparatus has a funnel waveguide configuration.

* * * * *